Sept. 23, 1958 J. W. DUGAN 2,853,030
FERTILIZER APPLICATOR ATTACHMENT
Filed Nov. 28, 1955
Fig. 1
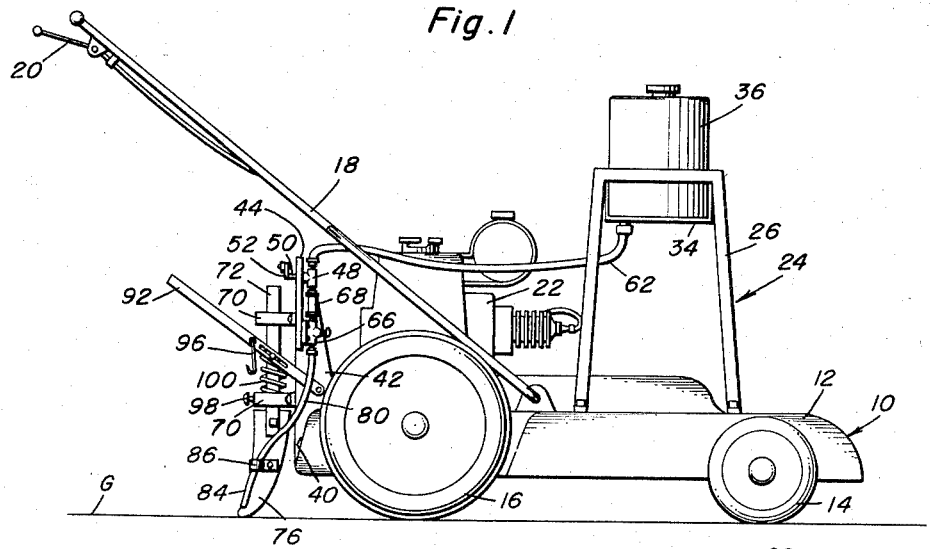
Fig. 2
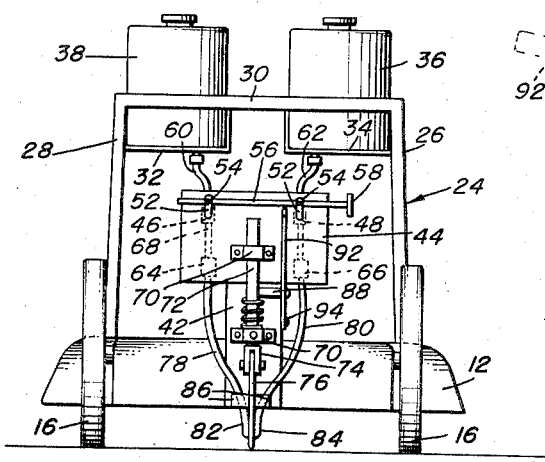
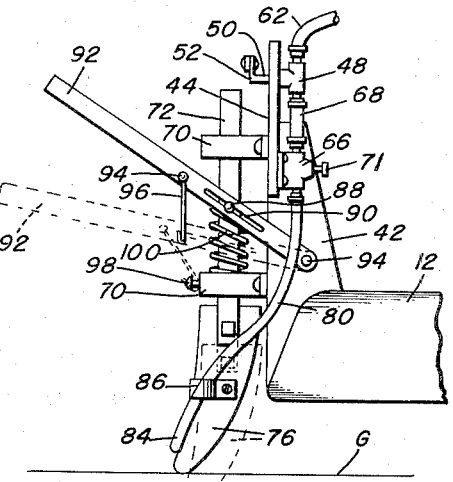
Fig. 3
John W. Dugan
INVENTOR.
BY *Clarence A. O'Brien*
*and Harvey B. Jackson*
Attorneys

United States Patent Office 2,853,030
Patented Sept. 23, 1958

2,853,030

FERTILIZER APPLICATOR ATTACHMENT

John W. Dugan, Houma, La., assignor to Flo-Mix Fertilizers Corporation, Houma, La., a corporation of Delaware Application November 28, 1955, Serial No. 549,309

1 Claim. (Cl. 111—7)

This invention relates generally to fertilizer applicator attachments, and a primary object of invention is particularly concerned with providing a sub-surface fertilizer attachment for hand manipulable agricultural equipment, such as lawn mowers, for example, whereby an aqueous solution of several active soil nutrients may be dispensed simultaneously and independently to combine beneath the surface of the soil being treated.

A further object of invention in conformance with that set forth above is to provide a fertilizer applicator attachment on a vehicular chassis wherein the attachment includes a metered supply of a plurality of combinable soil nutrients, said nutrients being simultaneously dispensed in independent relationship on a vertically adjustable trailing blade assembly supported on the vehicular chassis, the nutrients combining with each other beneath the surface of the soil being treated, as well as with constituents of the soil into which they are deposited.

A more specific object of invention in conformance with that set forth above is to provide a plurality of replaceable solution containers supported in elevated relationship on a vehicular chassis, said containers communicating with fluid conduits including metering and simultaneously actuated control valve means, the conduits terminating in flexible discharge portions disposed on opposite sides of a vertically adjustable plow blade supported in trailing relationship from a rear edge portion of the vehicular chassis, the active soil nutrients such as an aqueous solution of potassium hydroxide and ammonia, and a liquid solution of phosphoric acid being dispensed independently and simultaneously on opposite sides of the blade in a furrow formed thereby, resulting in the combining of the nutrients beneath the surface of the soil, said nutrients combining with each other as well as with the natural constituents of the soil.

A further object of invention in conformance with that set forth above is to provide a fertilizer applicator attachment of the character set forth which is readily and economically manufactured and installed, easily used and maintained, and highly utilitarian and efficient for the purposes intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the novel fertilizer applicator attachment in position on a hand manipulable lawn mower;

Figure 2 is a rear elevational view of the device in Figure 1; and

Figure 3 is an enlarged fragmentary side elevational view of the control means for the fertilizer applicator attachment, showing in dotted lines the alternate positions of the blade structure.

A lawn mower having the novel fertilizer applicator attachment is indicated generally at 10, said lawn mower including a housing or chassis member 12, front and rear wheels 14 and 16 suitably journaled on said housing, a rearwardly extending manipulating handle 18 incorporating thereon suitable control means 20 for controlling a power plant 22 suitably supported on the upper surface portion of the housing 12 of the lawn mower. A cutter blade assembly of the lawn mower is not shown, it being understood that a power driven lawn mower will serve merely as a tractor vehicle for supporting the fertilizer applicator attachment. Although the attachment has been disclosed as being mounted on a lawn mower it is to be understood that the fertilizer applicator attachment may be mounted on any suitable hand manipulable agricultural equipment which incorporates a chassis upon which said attachment may be mounted.

Suitably secured on a forward portion of the housing 12 is a vertically extending support frame 24, said frame comprising oppositely disposed inverted U-shaped leg portions 26 and 28 which are suitably connected to transverse support members 30 (only one being shown). The frame 24 incorporates a pair of suitable support strap assemblies 32 and 34 depending from the frame members 30 in any suitable manner, said support strap assemblies 32 and 34 accommodating removable solution containers 36 and 38 which will include therein a predetermined solution of a predetermined percentage of nutrients such as an aqueous solution of potassium hydroxide and ammonia in tank 36, and the tank 38 will contain liquid phosphoric acid. The liquid fertilizers are of the character which provide the maximum soil nutrition values when dispensed beneath the surface of the soil, however, the maximum efficiency of such liquid fertilizers is attained by dispensing the liquids separately but simultaneously beneath the sub-surface whereupon the chemical action therebetween as well as the chemical action of the natural constituents in the soil itself result in a highly beneficial deposit of mineral compounds for soil treatment.

Extending upwardly from the rear edge 40 of the housing 12, which may be considered to be a chassis member, and secured thereon in any suitable manner is a vertical support plate 42 which has secured on its upper end a transverse plate member 44 extending from opposite sides of the support plate. A pair of similar valve control members 46 and 48 are suitably secured in transverse spaced relation on a forward portion of the plate 44 in outwardly spaced relation to said support plate, said valve control members including a handle actuating portion 50 extending through the plate 44 and having an angulated end portion 52 which is pivotally connected at 54 to a transverse control rod 56. The rod 56 includes an enlarged handle portion 58 suitably secured on the end thereof and thus longitudinal movement of the rod 56 will rotate the valve stems 50 thus simultaneously and synchronously actuating the valves 46 and 48.

The valves 46 and 48 communicate by means of suitable connections and a flexible conduit 60 and 62 to the containers 38 and 36, respectively.

Suitably secured below the valves 46 and 48 are metering valve members 64 and 66, respectively, said metering valve elements being connected to the control valves by means of suitably connecting nipples 68 and being adjusted by means of an adjusting screw 71 whereby the amount of liquid fertilizer being dispensed will be controlled.

Extending rearwardly of the plate 44 and the vertical support member 42 are a pair of suitably secured vertically spaced bearing elements 70 which have vertically aligned apertures through which is received a shank portion 72, said shank having suitably secured in a bifurcated lower end portion 74 a vertically disposed plow knife or blade 76 which may be extended below the ground surface G, see Figure 3.

Each of the metering valves 64 and 66 have suitably secured thereto suitable flexible conduits 78 and 80, respectively, which have a discharge end 82 and 84, respectively, secured or disposed on opposite sides of the blade 76, the conduits being retained on the blade 76 by means of suitable retaining bracket clips 86. The valves 46, 48 and the valves 64, 66 together with the plate 44 space the conduits 78, 80 at opposite sides of the blade 76.

The shank 72 has extending laterally therefrom a pin element 88 which extends through an elongated slotted portion 90 of a control lever 92, said control lever 92 being pivoted at 94 on the vertical support member 42. Movement of the lever 92 in the position shown in the solid and dotted lines of Figure 3 results in the raising and lowering of the blade 76. The lever 92 has pivotally secured on an intermediate laterally extending pivot pin element 94 a suitable hook element 96 which is engageable with a pin element 98 extending from the lower bearing element 70. A compression spring element 100 is circumposed on the shank 72 between the lever 92 and the lower bearing element 70 urging the lever 92 and thus the shank 72 and plow blade 76 therewith upwardly in the position shown by the solid lines on the drawings.

The solutions of liquid fertilizer are deposited in the containers 36 and 38. The rod 56 is actuated to open the control valves 46 and 48, and the metering valves 64 and 66 are adjusted to permit a previously determined amount of the liquid to be distributed by means of gravity flow to the lower ends 82 and 84, respectively, of the flexible conduits 78 and 80, so that when the blade 76 is in the dotted position shown in Figure 3 the liquid fertilizer will be dispensed beneath the surface of the ground whereat said fertilizer liquids will react with each other and the constituents of the ground to economically and efficiently utilize the nutritive values thereof.

Various positional directional terms such as "front," "rear," etc. are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A fertilizing attachment for vehicles comprising a pair of vertical supports attachable on a vehicle chassis frame at opposite sides thereof, a pair of containers for discharging different fertilizer solutions mounted in elevated position on said supports, a vertical support plate attachable to a vehicle chassis frame between said supports in the rear of said frame, a transverse vertical plate fixed on said support plate below said containers and extending from opposite sides of the support plate, a pair of vertically spaced bearings, one on said support plate and the other on said transverse plate, a plow shank having a plow blade fixed thereon and adjustable upwardly and downwardly in said bearings to move the plow blade out of and into the ground, a pair of solution discharge control valves mounted on said transverse plate, means communicating said valves with said containers, a pair of flexible discharge conduits depending from said valves to opposite sides of the plow blade and secured thereto to discharge at opposite sides of said plow blade, a downwardly movable hand lever pivotally connected to said support plate and operatively connected to said shank for downward swinging to move the shank downwardly, and coacting devices on said lever and one of said bearings for locking said lever in downwardly swung position.

References Cited in the file of this patent

UNITED STATES PATENTS

| 482,919 | Gedeohn | Sept. 20, 1892 |
| 652,376 | Snell | June 26, 1900 |
| 1,191,006 | Jones | July 11, 1916 |
| 1,988,945 | Hansen | Jan. 22, 1935 |
| 2,415,251 | Leavitt | Feb. 4, 1947 |
| 2,509,627 | Bickerton | May 30, 1950 |

FOREIGN PATENTS

| 199,832 | Great Britain | July 2, 1923 |

OTHER REFERENCES

Down to Earth, Dow Chemical Company, Winter, 1954, pages 5 and 6 required.